United States Patent [19]

Oldford

[11] 4,015,313
[45] Apr. 5, 1977

[54] U-BOLT CLAMPING ELEMENT
[76] Inventor: William G. Oldford, 4944 Lakeshore, Lexington, Mich. 48450
[22] Filed: May 28, 1975
[21] Appl. No.: 581,540

Related U.S. Application Data
[63] Continuation of Ser. No. 462,624.

[52] U.S. Cl. .................................. 24/277
[51] Int. Cl.² ............................... B65D 63/00
[58] Field of Search ......... 24/277, 230 B; 248/243, 248/423; 403/234–237, 105; 292/318

[56] References Cited
UNITED STATES PATENTS

| | | | |
|---|---|---|---|
| 695,310 | 3/1902 | Hersh | 248/423 |
| 796,109 | 8/1905 | Brooks | 292/318 |
| 871,047 | 11/1907 | Sholes | 403/105 |
| 1,128,261 | 2/1915 | Swenson | 403/237 |
| 1,178,758 | 4/1916 | Sondley | 292/318 |
| 1,228,898 | 6/1917 | Frank | 403/105 |
| 1,871,064 | 8/1932 | Kipper et al. | 292/318 UX |

3,772,745  11/1973  Dowling et al. ............... 24/277

Primary Examiner—Werner H. Schroeder
Assistant Examiner—Doris L. Troutman
Attorney, Agent, or Firm—Harness, Dickey & Pierce

[57] ABSTRACT

A rod has teeth serrated along the sides of its end sections or rolled thereon somewhat as a thread. The rod is bent thereafter into U-shape having an arcuate web which encompasses one-half of a circular element such as a pipe, collar or the like. A locking element or saddle has spaced apertures to receive the two serrated ends when moved thereover to advance spring fingers into engagement with the serrations. The fingers retain the locking element or saddle in locked relation on the U-bolt which is secured to a collar which is clamped on a pipe or the like. Such an arrangement eliminates the expensive casting which requires machining and the cost of advancing nuts on the thread on the legs to secure the saddle thereon.

1 Claim, 8 Drawing Figures

U-BOLT CLAMPING ELEMENT

This is a continuation of application Ser. No. 462,624, filed Apr. 22, 1974, now abandoned.

BACKGROUND OF THE INVENTION

The following patents were developed in the search of the art covering the present invention. U.S. Pat. Nos.:

1,154,745; 3,051,424; 1,716,702; 3,161,425; 1,904,315; 3,765,343; 2,835,464;

German Pat. No. 116,093

SUMMARY OF THE INVENTION

The invention pertains to a U-bolt and a saddle therefor which produces a positive lock while substantially reducing the cost thereof. The U-bolt itself is made from a rod having both ends serrated to provide teeth on a side portion or the full circumference of the rod ends. The teeth may be rolled on the ends between a pair of dies to have them disposed in parallel relation or the teeth could be rolled on a lead between dies in the manner of rolling a helical thread on a bolt.

The saddle may take several forms, one may have a web with an arcuate cutout portion at the top with cylindrical sockets on the ends for receiving the ends of the rod after it is bent into U-form. If the U-bolt is employed for clamping a collar, such as that on a muffler, to a pipe, the U-bolt is first placed thereon, the saddle is inserted over the U-bolt ends and a tool is used for engaging the U-bolt and the saddle to force them together. The saddle has spring fingers extending downwardly in position to engage the teeth on the ends of the U-bolt to clamp the saddle thereto. Since the tubular ends are of substantial length, a pair of the locking fingers are provided thereon, one above the other and preferably spaced a distance relative to that of the spacing of the adjacent teeth so as to engage one of the teeth on the U-bolt ends. The saddle could be a flat or channel strap which is bent arcuately in the center following the shape of the U-bolt web having apertures in the ends with locking fingers in combination therewith which engage the teeth on the ends of the U-bolt when forced into locking relation therewith. The holes in the saddle strap are preferably cylindrical although they may take other shapes depending on the type of teeth, the position thereof and the shape of the U-bolt ends.

DESCRIPTION OF THE PREFERRED EMBODIMENTS

Figure 1:
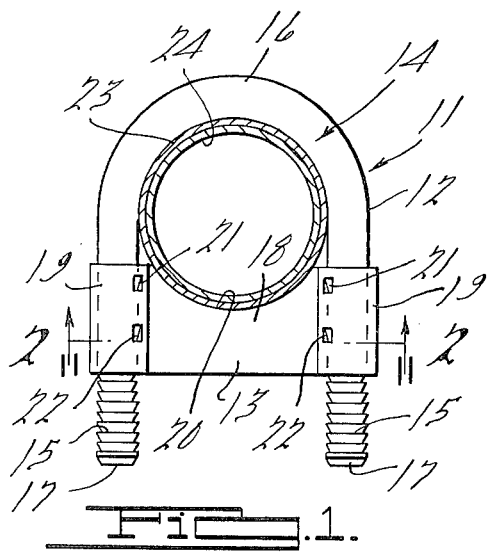
FIG. 1 is a view in elevation of a U-bolt having a saddle on the ends thereof containing fingers which engage teeth on the ends in a manner embodying features of the present invention.
Figure 2:
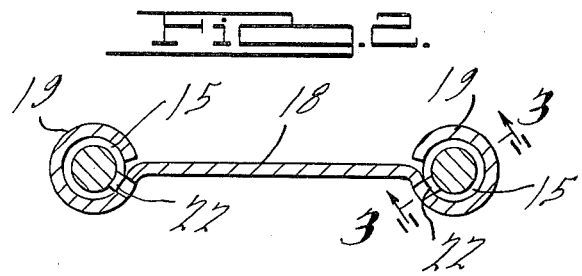
FIG. 2 is an enlarged sectional view of the structure illustrated in FIG. 1, taken on the line 2—2 thereof.
Figures 3, 4:
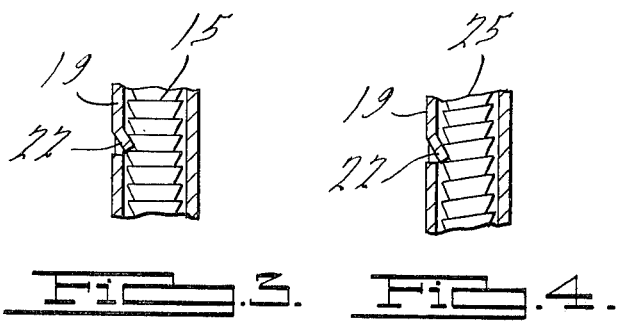
FIG. 3 is a sectional view of the structure illustrated in FIG. 2, taken on the line 3—3 thereof.
FIG. 4 is a view of structure, similar to that illustrated in FIG. 3, showing a further form of teeth on the U-bolt ends.

The clamping element 11 embodies a U-bolt 12 and a saddle 13, as illustrated in FIGS. 1, 2 and 3. The U-bolt is preferably made from a rod 14 of predetermined length having teeth 15 rolled, coined or otherwise produced on the opposite ends thereof. Thereafter, the U-bolt is bent in the center on an arc providing a semi-circular web 16 from which the ends 17 extend. The saddle 13 has a central web 18 and two cylindrical ends 19 provided with spring locking fingers 21 near the top edge and spring locking fingers 22 disposed near the bottom edge. The U-bolt 12 is placed over a collar 23 of a muffler or other element which is to be clamped to a pipe 24. The pipe is telescoped within the collar and the U-bolt 12 is placed thereover after which the cylindrical ends 19 of the saddle 13 are slid over the ends 17 of the U-bolt and forced upwardly thereon. A tool is provided which engages the U-bolt and saddle and forces them toward each other to clamp the collar onto the pipe. A plyer-like element could be used which engages the teeth 15 on the ends 17 and forces the cylindrical ends 19 of the saddle 13 upwardly on the U-bolt ends. The locking fingers 21 and 22 are spaced differently from the adjacent teeth 15 so that one or the other will produce the locking which will occur within half of the spacing of the teeth when the pairs of fingers are so disposed. The fingers engage a tooth of the teeth 15 as illustrated in FIG. 3 and maintain the saddle in clamping relation with the U-bolt.

Reference may be had to FIG. 4 wherein the teeth 25 are the same as the teeth 15 with the exception that they are rolled or otherwise formed on the rod ends 17 on a helix the same as a thread. The locking effect with the fingers 21 or 22 when the ends are sloped on the lead will be the same as that above described with relation to the teeth 15 which are in parallel relation to each other. It is to be understood that the fingers 21 and 22 can be formed on both sides of the cylindrical ends 19 spaced differently from each other and the fingers on the opposite side thereof.

Figures 5, 6:
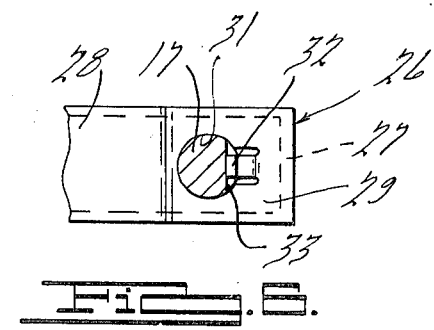
FIG. 5 is a view of structure, similar to that illustrated in FIG. 1, showing another form of the invention.
FIG. 6 is a sectional view of the structure illustrated in FIG. 5, taken on the line 6—6 thereof.

A further form of the invention is illustrated in FIGS. 5 and 6 that wherein a saddle 26 has two end sections 27 and an arcuate central section 28 which are of channel section. The web 29 of the ends 27 contain an aperture 31 into which the legs 17 of the U-bolt extend. A finger 32 is struck in the side of the ends 27 which engage teeth 33 on the legs 17 to lock the saddle 26 thereon. The aperture 31 is herein illustrated as being circular, conforming to the circular shape of the legs 17 of the U-bolt. It is to be understood that the aperture may be D in shape, square, of polygonal or any other form conforming to the shape of the legs 17. The saddles are preferably made of spring, stainless or like steel or if other types of steel are employed, spring fingers may be riveted or otherwise secured thereto to produce the locking of the saddle on the legs of the U-bolt.

Figure 7:
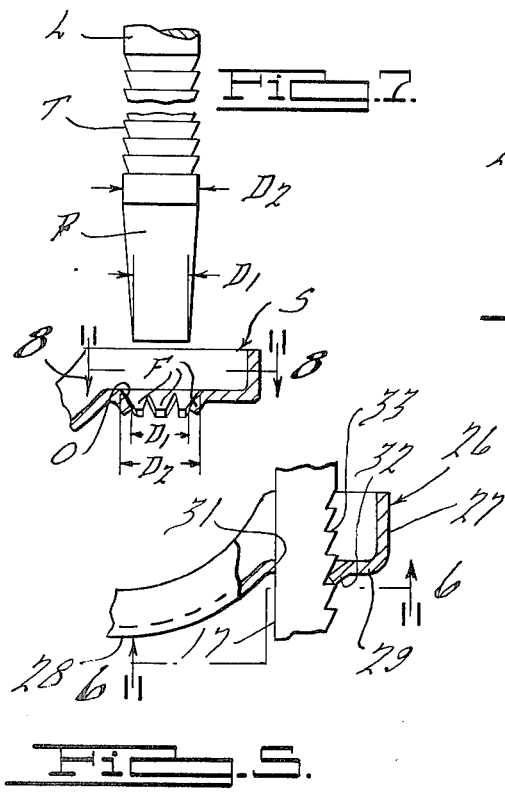
FIG. 7 is an exploded assembly view, partially broken away, showing another embodiment of the present invention.
Figure 8:
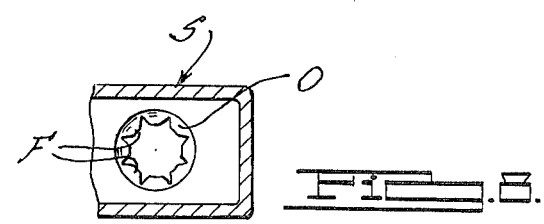
FIG. 8 is a transverse fragmentary cross-sectional view taken substantially along the line 8—8 of FIG. 7.

FIGS. 7 and 8 illustrate yet another embodiment of the present invention wherein the legs L of a U-bolt are formed with lower frustoconical pilot portions P directly below the serrated or teeth areas T thereon. As illustrated in FIG. 7, the pilot portions are tapered from a lower smaller or minor diameter $D_1$ to a major diameter $D_2$. The associated saddle S is formed with a pair of circular openings O, one of which is associated with each of the legs L and one of which is shown in FIGS. 7 and 8. The openings O are similar to the aforedescribed apertures 31, with the exception that a plurality of inwardly and downwardly extending circumferentially spaced fingers, generally designated F, are provided around the periphery of the openings O. As illustrated, the fingers F are inclined radially inwardly and downwardly so that the radially innermost portions thereof lie around the periphery of an imaginary circle having a diameter approximately equal to $D_1$, while the overall diameter of the openings O is approximately or slightly larger than the aforementioned dimension $D_2$. As will be appreciated by those skilled in the art, when the saddle S is mounted on the U-bolt, the pilot portions P will cause the fingers F to deflect or deform slightly outwardly until the saddle S is moved along the legs L to a position wherein the fingers F are nestingly engaged with the desired teeth T, as above described. The particular advantage of this construction resides in the fact that a greater holding strength is achieved by virtue of the use of a plurality of the fingers F, as opposed to only a single finger in the above-described embodiments. As will be appreciated, if even greater strength is desired, the fingers F could be heat treated in a well known manner.

I claim:

1. A clamp for a cylindrical element embodying a U-bolt having an arcuate web and two extending legs, teeth on said legs having parallel top surfaces with inwardly sloping walls therebelow forming arcuate notches, a saddle constructed from a sheet metal body having a central web portion with an arcuate edge, aperture portions on said body disposed on either side of said central web which receive said legs , and a plurality of vertically spaced fingers formed integrally with the body having the ends extending into the aperture portions in position to deflect inwardly and outwardly over the sloping walls of the legs until one of the ends in each aperture portion rests upon the top surface of a tooth on each leg, the plurality of fingers being fractionally spaced a portion of the distance between a pair of said parallel top surfaces of the teeth. /

* * * * *